United States Patent [19]

Franks et al.

[11] Patent Number: 5,212,245

[45] Date of Patent: May 18, 1993

[54] THERMOSETTING POWDER COATING COMPOSITIONS CONTAINING FLOW MODIFIERS

[75] Inventors: James R. Franks, Allison Park, Pa.; Paul H. Pettit, Jr., Strongsville, Ohio

[73] Assignee: PPG Industries, Inc., Pittsburgh, Pa.

[21] Appl. No.: 845,571

[22] Filed: Mar. 4, 1992

[51] Int. Cl.$^5$ .................. C08L 33/14; C08F 63/00; C08G 63/91; B32B 15/04

[52] U.S. Cl. .................. 525/223; 525/108; 525/119; 525/418; 525/420; 525/450; 525/934; 524/904; 428/334; 428/335; 428/457

[58] Field of Search ............ 524/558, 904; 525/108, 525/119, 223, 934, 418, 420, 450; 428/334, 335, 457

[56] References Cited

U.S. PATENT DOCUMENTS

| | | | |
|---|---|---|---|
| 3,787,340 | 1/1974 | Labana et al. | 524/520 |
| 4,246,368 | 1/1981 | Murase | 525/223 |
| 4,801,680 | 1/1989 | Geary et al. | 525/418 |
| 4,804,581 | 2/1989 | Geary et al. | 428/332 |
| 4,988,767 | 1/1991 | Pettit | 525/108 |

*Primary Examiner*—Paul R. Michl
*Assistant Examiner*—Tae H. Yoon
*Attorney, Agent, or Firm*—William J. Uhl

[57] ABSTRACT

Thermosetting powder coating compositions comprising a curable particulate resinous material and a flow control agent which is a copolymer of an alkyl acrylate or methacrylate containing from 6 to 20 carbon atoms in the alkyl group and a hydroxyalkyl acrylate or methacrylate. The flow modifiers enhance the rheology of the thermosetting powder coating composition providing for smoother coatings while at the same time not adversely affecting appearance or adhesion with associated coatings, for example, previously applied electrodeposited primers or subsequently applied topcoats.

17 Claims, No Drawings

THERMOSETTING POWDER COATING COMPOSITIONS CONTAINING FLOW MODIFIERS

FIELD OF THE INVENTION

The present invention relates to thermosetting powder coating compositions containing flow modifiers.

BACKGROUND OF THE INVENTION

Typical powder coating compositions contain a flow modifier or a flow control agent to enhance the rheology of the coating composition and provide for smoother, better looking coatings. Common flow modifiers include low glass transition temperature acrylics such as poly(2-ethylhexyl acrylate). See in this regard U.S. Pat. No. 3,787,340 to Labana et al.

Powder coating compositions are widely used in a variety of industrial applications which require their use with associated coatings. For example, the powder coating compositions are often used as primer surfacers or chipguard primers. In this instance, they are topcoated with typical finishing coat compositions and the flow control agents such as those mentioned above adversely affect the intercoat adhesion between the topcoat and the powder primer surfacer. In addition, powder coatings are often applied as chipcoat primers over uncured, dehydrated electrodeposited coatings. See, for example, U.S. Pat. No. 4,804,581. In this application, the chipguard primer is only applied to a portion of the electrodeposited coating, usually in the areas that are subjected to stone chipping, i.e., rocker panels and wheel wells. The composite coating is then co-cured in one step and topcoated with a conventional finishing coat. In applying the chipguard primer to only a portion of the dehydrated, uncured electrodeposited primer, there is an area of overspray where the powder coating composition impacts the electrodeposited primer in areas other than that to be coated. When the chipguard primer contains conventional flow control additives such as those described above, severe cratering of the electrodeposited primer often results.

SUMMARY OF THE INVENTION

In accordance with the present invention, a thermosetting powder coating composition comprising:
(a) from 95.0 to 99.99 percent by weight based on weight of resin solids of a curable particulate resinous material and
(b) from about 0.01 to 5 percent by weight based on weight of resin solids of a flow control agent
is provided. The flow control agent is a copolymer of polymerizable ethylenically unsaturated monomers comprising 40 to 80 percent by weight based on weight of polymerizable ethylenically unsaturated monomers of an alkyl acrylate or methacrylate containing from 6 to 20 carbon atoms in the alkyl group and from 10 to 50 percent by weight based on weight of polymerizable ethylenically unsaturated monomers of a hydroxyalkyl acrylate or methacrylate. The copolymer has a weight average molecular weight of at least 4000 and a glass transition temperature lower than 10° C. The flow control agent does not adversely affect intercoat adhesion when the thermosetting coating composition is used as a primer surfacer or a chipguard primer in association with previously applied electrodeposited primers and subsequently applied topcoat compositions.

The invention also provides for a coated article comprising a substrate and a composite coating adhered to the substrate which comprises:
(i) an electrodeposited primer layer having as a first coating layer deposed directly on the substrate;
(ii) a coating layer derived from the composition of claim 1; and
(iii) a topcoat layer deposed on the previously applied layer (ii).

DETAILED DESCRIPTION OF THE INVENTION

The thermosetting powder coating compositions of the present invention include an intimate particulate mixture of several materials including a particulate curable resinous material of a thermosetting nature and the flow modifier of the invention.

The curable particulate resinous material can be selected from those well known in the art of powder coating compositions. They can be, for example, an epoxy resin such as an epoxy group-containing acrylic polymer or a polyglycidyl ether of a polyhydric alcohol and a suitable curing agent for the epoxy resin such as a polyfunctional carboxylic acid group-containing material or a dicyanamide. Examples of curable particulate resinous materials are described in Reissue U.S. Pat. No. 32,261 and U.S. Pat. No. 4,804,581. Examples of other curable particulate resinous materials are carboxylic acid functional resins such as carboxylic acid functional polyesters and acrylic polymers and suitable curing agents for such materials such as triglycidyl isocyanurate and beta-hydroxyalkylamide curing agents as described, for example, in U.S. Pat. No. 4,801,680 and 4,988,767. The curable resinous materials of U.S. Pat. No. 4,988,767 are particularly preferred in the preparation of primer surfacers.

The flow modifiers of the present invention are copolymers of (i) alkyl acrylates or methacrylates containing from 6 to 20 carbon atoms in the alkyl group and hydroxyalkyl acrylates or methacrylates preferably containing from 2 to 8 carbon atoms in the hydroxyalkyl group. Examples of alkyl acrylates or methacrylates (i) are hexyl acrylate and methacrylate, 2-ethylhexyl acrylate, isodecyl methacrylate and lauryl methacrylate with 2-ethylhexyl acrylate being preferred. The alkyl acrylates or methacrylates (i) are used in amounts of about 40 to 80, preferably 50 to 70 percent by weight, based on total weight of polymerizable ethylenically unsaturated monomers.

Examples of hydroxyalkyl acrylates or methacrylates (ii) are hydroxyethyl methacrylate and hydroxypropyl acrylate, which is preferred. The hydroxyalkyl acrylates or methacrylates are used in amounts of 10 to 50, preferably 20 to 40 percent by weight based on total weight of polymerizable ethylenically unsaturated monomers.

In addition to the essential polymerizable ethylenically unsaturated monomers (i) and (ii), the copolymer can contain moieties obtained from other polymerizable ethylenically unsaturated monomers. Examples of such monomers would be vinyl aromatic monomers such as styrene and alpha-methylstyrene; nitriles such as acrylonitrile; vinyl and vinylidene halides such as vinyl chloride and vinylidene fluoride; vinyl esters such as vinyl acetate and alkyl acrylates or methacrylates containing from 1 to 4 carbon atoms in the alkyl group such as methyl methacrylate, butyl acrylate and butyl methacrylate, which is preferred. When these optional polymerizable ethylenically unsaturated monomers are used, they are used in amounts of up to 30, preferably 5 to 30 percent by weight based on total weight of polymerizable ethylenically unsaturated monomers.

The identity and the amount of the polymerizable ethylenically unsaturated monomer should be selected such that when polymerized as described in more detail below, the resulting polymer preferably will have a hydroxyl value of from 120 to 250, more preferably 120 to 160 determined according to ASTM E-222-76, method B, determined on resin solids, and a glass transition temperature ($T_g$) of less than 10° C., more preferably in the range of −50° to 0° C. The hydroxyl value is on a solids basis and is determined according to ASTM E-222. The $T_g$ of the polymer can be calculated as described by Fox in Bull. Amer. Physics. Soc., 1,3 page 123 (1956). The $T_g$ can also be measured experimentally and differential scanning calorimetry can be used (rate of heating 10° C. per minute, $T_g$ taken at the first inflection point). Unless otherwise indicated, the stated $T_g$ as used herein refers to the calculated $T_g$.

Hydroxyl values lower than 120 are not preferred because of poor coating adhesion, whereas hydroxyl values greater than 160 are not preferred because of powder coatings appearance considerations.

$T_g$'s greater than 10° C. are not preferred because of poor flow on coating application, whereas $T_g$'s less than −50° C. are not preferred because of poor compatibility of the powder coating over uncured cathodic E-coat primer.

The polymeric flow control agent can be prepared by heating the polymerizable ethylenically unsaturated monomers together preferably in the presence of an organic solvent and in the presence of a free radical initiator, e.g., an organic peroxide such as tertiary-amyl peroxy acetate, tertiary-butyl perbenzoate and the like, or an azo compound such as azobisisobutyronitrile and the like, at a temperature generally up to the reflux of the copolymerizable material, generally temperatures from 30° C. to about 220° C., preferably from 80° to 180° C, for a time sufficient to complete the polymerization, generally a period of time varying between 1 to 24 hours, preferably 1 to 3 hours.

The copolymers used as flow modifiers preferably have weight average molecular weights of at least 4000, more preferably about 4,000 to 15,000. The weight average molecular weight of the copolymers can be determined by gel permeation chromatography (GPC) using a polystyrene standard. By such method, it is not the actual molecular weight which is measured but an indication of the molecular weight as compared to polystyrene. The values which were obtained are commonly referred to as polystyrene numbers; however, for the purposes of this application, they are referred to as molecular weights. Molecular weights (weight average) less than 4000 are not preferred because the copolymer loses surface activity, i.e., loss of flow control, whereas molecular weights greater than 15,000 are not preferred because of poor flow properties due to high viscosity.

The adhesion of the flow control agents of the present invention can be modified by reacting the copolymer with from 1 to 10, preferably 1 to 5, percent by weight of an anhydride of a cyclic hydrocarbon; the percentage by weight being based on weight of copolymer and cyclic hydrocarbon. Such modification introduces carboxylic acid functionality into the copolymer which can further increase the adhesion properties of the resulting coating. Examples of anhydrides of cyclic hydrocarbons are tetrahydrophthalic anhydride, hexahydrophthalic anhydride, alkyl-substituted hexahydrophthalic anhydrides such as methylhexahydrophthalic anhydride. Hexahydrophthalic anhydride is preferred. Use of greater than 10 percent by weight of anhydride is not preferred because of poor flow properties. The anhydride modified copolymers will typically have acid values of 5 to 25 measured on a resin solids basis and determined according to ASTM E-222.

The thermosetting powder coating compositions of this invention generally contain from 95 to 99.9 percent by weight of a particulate thermosetting resinous material and from about 0.01 to about 5 percent by weight of the flow modifier, i.e., the copolymer; the percentages by weight being based on total weight of the particulate resinous material and flow modifier. Preferably, the copolymer will be included in the powder coating composition in amounts of 0.1 to 3 percent by weight, more preferably from about 0.5 to about 2 percent by weight.

The thermosetting powder coating compositions of the invention can optionally include other materials such as pigments, fillers, light stabilizers and anti-oxidants. Further, the compositions can include anti-popping agents. A pigment can be included in the coating composition in amounts of 1 to 50 percent by weight based on total weight of the composition in order to give a suitable color to the resultant coating. Suitable pigments include, for example, titanium dioxide, ultramarine blue, phthalocyanine blue, phthalocyanine green, carbon black, graphite fibrils, black iron oxide, chromium green oxide, ferride yellow and quindo red.

Anti-popping agents can be added to the composition to allow any volatile material to escape from the film during baking. Benzoin is a commonly preferred anti-popping agent and when used is generally present in amounts of from 0.5 to 3.0 percent by weight based on total weight of the powder coating composition.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The flow additive of the present invention can be adsorbed onto a precipitated silica surface to provide for a more free flowing silica powder which is typically 60–70 percent by weight active in terms of flow additive content.

The thermosetting powder coating compositions are prepared by melt blending the ingredients. This can be accomplished by first blending the ingredients in a high shear mixer such as a planetary mixture, and then melt blending in an extruder from about 80° C. to about 130° C. The extrudate is then cooled and pulverized into a particulate blend. Such a particulate mixture then can be applied preferably by spraying techniques. The thermosetting powder coating compositions of the invention can be used as primers or topcoats but preferably they are used as primer surfacers or as chipguard primers in which they are applied over previously applied electrodeposited primers and then subsequently topcoated with a standard finishing composition.

The particulate thermosetting powder coating composition can be applied directly to a substrate of, for example, metal such as steel or aluminum. Application can be by spraying, and in the case of a metal substrate, by electrostatic spraying which is preferred, or by the use of a fluidized bed. The coating composition can be applied as a topcoat or as a finishing coat or as a primer, primer surfacer or chipguard primer. The coating powder can be applied in a single sweep or in several passes to provide a film having a thickness after cure of from 1 to 15, usually 2.0 to 4.0 mils.

After application of the coating powder, the powder coating substrate is baked at a temperature sufficient to cure the product, typically at about 250° F. to about 400° F. (121° to 204° C.) for about 1 to 60 minutes, and preferably at about 300° F. to 350° F. (149° to 177° C.) for about 10 to 30 minutes.

While the powder coating composition can be applied directly upon bare metal, that is, upon untreated, unprimed steel or upon pretreated, i.e., phosphatized unprimed steel, a particularly preferred embodiment of the invention is the application of the powder coating composition upon a metal substrate having a thin layer of electrodeposited primer coating. The electrodeposited primer layer can be cured or uncured before application of the powder coating composition. The electrodeposited primer coating upon the metal substrate can be, for example, a cathodic electrodeposition primer composition such as those available from PPG Industries, Inc. under the UNI-PRIME trademark. In one aspect of the present invention it is contemplated that the powder coating composition can be applied directly upon at least a portion of an uncured electrodeposited primer coating, for example, the electrodeposited primer coating deposited over an automotive or truck body and thereafter both the electrodeposited primer coating and primer coating can be co-cured by heating at a temperature between 300° to 350° F. (149° to 177° C.) for about 10 to 30 minutes. When using the powder coating composition of the present invention as a chipguard primer, the coating can be applied to a portion of the electrodeposited coating, for example, that portion susceptible to stone chipping leaving the rest of the area of the electrodeposited primer uncoated with the chipguard primer.

After application and curing of the powder coating composition, at least one topcoat layer can be applied to the powder coating layer. The topcoat can be, for example, organic solvent-based or water-based topcoat compositions well known in the art. Specific examples would be solvent-based polyester or acrylic polymer coating compositions cured with an aminoplast.

EXAMPLES

The following examples show the preparation of various ingredients utilized in the thermosetting powder coating compositions of the present invention.

EXAMPLE A

This example shows the preparation of a hydroxy functional polyacrylate flow additive. The additive was prepared from the following mixture of ingredients:

| Ingredients | Parts by Weight |
| --- | --- |
| 2-ethylhexyl acrylate | 43.2 |
| Hydroxypropyl acrylate | 17.7 |
| LUPERSOL-555 M60[1] | 0.9 |
| Xylene | 38.2 |

[1] t-amylperoxyacetate free radical initiator available from Atochem North America Inc.

A suitable reaction vessel was charged with 800 grams of xylene and heated to 135° C. under a nitrogen atmosphere. Separate acrylic monomer and initiator feeds were employed. The initiator was fed over a period of 3.5 hours. Five minutes after the start of the initiator feed, the monomer feed was started and continued over a period of 3 hours. The reaction temperature was maintained at 135° C. over the period of the reaction. After the initiator feed ran out, the reaction vessel was held at 135° C. for another hour. The final resinous reaction product had a solids content of 62 percent and a hydroxyl value of 160 based on resin solids.

EXAMPLE B

A hydroxy functional polyacrylate flow additive modified with methylhexahydrophthalic anhydride was prepared as follows:

| Ingredients | Parts by Weight |
| --- | --- |
| Lauryl methacrylate | 23.3 |
| Hydroxypropyl methacrylate | 24.5 |
| Butyl methacrylate | 10.4 |
| Methylhexahydrophthalic anhydride (mHHPA) | 2.5 |
| LUPERSOL 555-M60 | 4.5 |
| Xylene | 34.8 |

A suitable reaction vessel was charged with 960 grams of xylene and heated to 135° C. under a nitrogen atmosphere. Separate acrylic monomer and initiator feeds were employed. The initiator was fed over a period of 3.5 hours. Five minutes after the start of the initiator feed, the monomer feed was started and continued over a period of 3 hours. At the completion of the monomer and initiator feeds, the reaction temperature was maintained at 135° C. for an additional hour. The reaction vessel was then cooled to 120° C. and the mHHPA was added. The reaction between —OH and anhydride was followed by IR (infrared spectroscopy). At the disappearance of the anhydride peak, the reaction was considered complete. From the addition of the mHHPA to the disappearance of the anhydride peak, a period of 5.5 hours passed. The reaction vessel was then cooled and the reaction product poured into a suitable container. The final resinous reaction product had a solids content of 58.6 percent, a hydroxyl value of 145 and an acid value of 21 based on resin solids.

EXAMPLE C

An acid functional acrylic polymer was prepared by polymerizing under free radical initiated organic solution polymerization techniques the following monomers: styrene (21 percent), methyl methacrylate (64 percent), acrylic acid (12 percent) and methacrylic acid (3 percent); the percentages are by weight being based on weight of monomers. Solvent was removed by vacuum stripping. The polymer had an acid value of 80 and a number average molecular weight of about 2000 as determined by gel permeation chromatography using a polystyrene standard.

EXAMPLE D

An acid functional polyester flexibilizing resin was prepared from the following ingredients:

| Ingredients | Parts by Weight |
| --- | --- |
| 1,6-hexanediol | 7.32 |
| Dodecanedioic acid | 6.50 |
| Triphenylphosphite | 0.90 |
| Dibutyltin oxide | 0.00 |

| -continued  |                |
|-------------|----------------|
| Ingredients | Parts by Weight |
| Xylene      | 15.00          |

The ingredients were charged into a suitable reaction vessel and heated to reflux (133° C.) under a nitrogen atmosphere. The amount of water removed by distillation and the acid value were monitored during the course of the reaction. After seven hours, the reactor temperature was 170° C. and the reaction had reached completion, at which point the reaction vessel was cooled to 125° C., a vacuum was drawn and the xylene was removed by heating under vacuum. The resin was poured hot into metal pans and allowed to cool and solidify. The resin had an acid value of 175 and a melting point of 80° C.

EXAMPLE E

A beta-hydroxyalkylamide crosslinking agent was prepared as follows:

Bis[N,N-di(beta-hydroxyethyl)] adipamide-glutaramide was prepared from the following mixture of ingredients:

| Ingredients | Parts by Weight (in grams) |
|-------------|----------------------------|
| 90/10 weight ratio of dimethyladipate/dimethylglutarate | 1038.0 |
| Diethanolamine | 1512.0 |
| Methanolic sodium methoxide | 4.7 |

The ingredients were charged to a reaction vessel and heated to about 100° C. at which point the distillation of methanol began. Reaction was continued while distilling methanol (303 grams) until a temperature of 128° C. was reached. An additional 5 ml of methanolic sodium methoxide was added and heating continued until an additional 5 grams of methanol was obtained. A slight vacuum was applied to the reaction flask and an additional 28 grams of methanol was removed. The methanol distillate was added slowly back to the reaction mixture followed by the addition of 200 ml of acetone. As the reaction mixture cooled, the hydroxyalkylamide precipitated. The precipitate was filtered, washed with acetone and air dried to yield a reaction product melting at 114°-118° C.

EXAMPLE 1

A pigmented powder coating composition was prepared from the following mixture of ingredients:

| Ingredients | Parts by Weight (in grams) |
|-------------|----------------------------|
| Acid functional acrylic polymer of Example C | 490 |
| Acid functional flexibilizer of Example D | 123 |
| Beta-hydroxyalkylamide crosslinker of Example E | 131 |
| Hydroxy functional flow additive of Example A | 12 |
| TINUVIN-123[1] | 7.5 |
| TINUVIN-900[2] | 15 |
| Benzoin | 7 |
| Carbon black | 15 |

[1]Hindered amine light stabilizer available from Ciba-Geigy Corp.
[2]UV light absorber available from Ciba-Geigy Corp.

The ingredients were blended in a planetary mixer for about 2 to 3 minutes then melt blended in a twin-screw co-rotating extruder at 135° C., broken into chunks and ground in a micromill to a fine powder. The powder was sieved through a 200-mesh screen to remove particles larger than 75 microns.

The resulting powder coating composition was then sprayed electrostatically onto zinc phosphated pretreated steel panels having a 1. to 2. mil thick layer of cured electrodeposited primer. (The electrodeposition primer composition was available from PPG Industries, Inc. as UNI-PRIME ED-11.) The powder coating system was then cured at 340° F. (171° C.) for 30 minutes. A smooth, high gloss primer surfacer resulted. A topcoat including an acrylic/polyester/aminoplast basecoat layer (HUBC 9225 available from PPG Industries, Inc.) of about 0.6 to 0.8 mils thick and an acrylic/polyester/aminoplast clearcoat layer (URC 1000 available from PPG Industries, Inc.) of about 1.8 to 2.0 mils thick were applied over the cured powder coating layer and then cured for 30 minutes at 250° F. (121° C.).

The powder layer had excellent appearance and adhesion to the topcoat particularly when compared to similar systems which used no flow control additive and in which the hydroxy functional flow additive was substituted with a commercially available flow additive, i.e., a poly(2-ethylhexylacrylate) commercially available from Monsanto as MODAFLOW-III.

When no flow control additive was used, the cured powder coating layer was badly cratered.

The crosshatch adhesion (ASTM D-3359-87) of the topcoat to the powder coating layer containing the hydroxy functional flow additive was 5B whereas the adhesion to the cured powder layer containing the MODAFLOW-III was 0B. The crosshatch adhesion ratio scale was from 0B to 5B with 0B indicating total loss of adhesion an 5B indicating no loss of adhesion.

EXAMPLE 2

A pigmented powder coating composition for use as a chipguard primer was prepared from the following mixture of ingredients:

| Ingredients | Parts by Weight |
|-------------|-----------------|
| EPON 2002[1] | 644 |
| Phenolic resin[2] | 195 |
| Diacid[3] | 234 |
| Hydroxy functional polyacrylate flow additive of Example A | 13 |
| IRGANOX 1076[4] | 17 |
| Benzoin | 7 |
| Titanium dioxide | 86 |
| Carbon black | 0.3 |

[1]Polyglycidyl ether of bisphenol A having an epoxy equivalent weight of 700.
[2]Phenolic resin available from Ciba-Geigy Corp. as XU-251.
[3]Dodecyldioic acid.
[4]Anti-oxidant was available from Ciba-Geigy Corp.

The ingredients were blended in a planetary mixer for about 2 to 3 minutes, then melt blended in a twin-screw co-rotating extruder at 110° C., broken into chunks and ground in a micromill to a fine powder. The powder was sieved through a 200-mesh screen to remove particles larger than 75 microns.

The resulting powder coating composition was then sprayed electrostatically onto a portion of a steel panel having a layer of uncured/dehydrated electrodeposited primer, i.e., UNI-PRIME ED-11 from PPG Industries, Inc. Both the powder coating layer and the electrodeposited primer were then co-cured at 340° F. (171° C.). A smooth chipguard powder primer having a thickness of 2.0 to 4.0 mils resulted. In the areas where the powder overspray fell on the uncured/dehydrated electrodeposited primer, no cratering of the electrodeposited primer resulted on curing.

The composition was topcoated with an acrylic/polyester/aminoplast basecoat clearcoat system as referred to in Example 1 to form the final coated product. When a comparable system was prepared but in substituting the poly(2-ethylhexylacrylate) flow additive used in Example 1 for the hydroxy functional flow additive of Example A, considerable cratering of the electrodeposited primer resulted in the overspray area. With no flow control additive, massive cratering of the cured powder layer and of the electrodeposited primer in the overspray area resulted.

EXAMPLE 3

A pigmented powder coating composition containing the hydroxy and carboxylic acid functional polyacrylate flow additive of Example B was prepared from the following mixture of ingredients:

| Ingredients | Parts by Weight |
| --- | --- |
| Acid functional acrylic of Example C | 61.2 |
| Acid functional flexibilizer of Example D | 15.4 |
| Beta-hydroxyalkylamide crosslinker of Example E | 16.3 |
| Hydroxy acid functional flow additive of Example B | 1.5 |
| TINUVIN-123 | 0.9 |
| TINUVIN-900 | 1.9 |
| Benzoin | 0.9 |
| Carbon black | 1.9 |

The ingredients were blended and particulated and applied to a cured electrodeposited primer layer, cured and topcoated all as described in Example 1. The powder layer had excellent appearance and adhesion to the topcoat particularly when compared to similar systems in which the hydroxy acid functional flow additive was substituted with the poly(2-ethylhexylacrylate) flow additive used in Example 1.

The crosshatch adhesion (ASTM D-3359-87) of the topcoat to the powder coating layer containing the hydroxy acid functional flow control additive was 5B whereas the adhesion to the cured powder layer containing the poly(2-ethylhexylacrylate) was 0B.

We claim:

1. A thermosetting powder coating composition comprising:
   (a) from 95.0 to 99.99 percent by weight of a curable particulate resinous material and
   (b) from 0.01 to 5.0 percent by weight of a flow control agent being a copolymer having a weight average molecular weight of at least 4000 and a glass transition temperature less than 10° C.; said copolymer being prepared from polymerizing polymerizable ethylenically unsaturated monomers comprising:
      (i) 40 to 80 percent by weight of an alkyl acrylate or methacrylate containing from 6 to 20 carbon atoms in the alkyl group and
      (ii) from 10 to 50 percent by weight of a hydroxyalkyl acrylate or methacrylate.

2. The composition of claim 1 in which the curable resinous material is based on a carboxylic acid group-containing polymer and a hydroxyalkylamide curing agent.

3. The composition of claim 1 in which the curable resinous material is based on a polyepoxide and a polyacid curing agent.

4. The composition of claim 1 in which the copolymer additionally contains from 5 to 30 percent by weight of an alkyl acrylate or methacrylate containing from 1 to 4 carbon atoms in the alkyl group.

5. The composition of claim 1 in which the copolymer is prepared by organic solution polymerization techniques.

6. The composition of claim 1 in which the copolymer has a weight average molecular weight of from 4000 to 15,000.

7. The composition of claim 1 in which the copolymer has a glass transition temperature within the range of −50° to 0° C.

8. The composition of claim 1 in which the alkyl acrylate or methacrylate containing from 6 to 20 carbon atoms is selected from the class consisting of lauryl methacrylate and 2-ethylhexyl acrylate.

9. The composition of claim 1 in which the hydroxyalkyl acrylate or methacrylate is selected from the class consisting of hydroxypropyl methacrylate and hydroxypropyl acrylate.

10. The composition of claim 4 in which the alkyl acrylate or methacrylate containing from 1 to 4 carbon atoms is butyl methacrylate.

11. The composition of claim 1 in which the copolymer is post-reacted with a cyclic anhydride to introduce carboxylic acid functionality into the copolymer.

12. The composition of claim 1 which has a hydroxyl value of 120 to 160.

13. The composition of claim 11 which has an acid value of 5 to 25.

14. A coated article comprising:
   (a) a substrate,
   (b) a composite coating adhered to the substrate comprising:
      (i) an electrodeposited primer layer as a first coating layer deposed directly on the substrate;
      (ii) a primer surfacer layer deposed on the electrodeposited primer, said primer surfacer being derived from the composition of claim 1;
      (iii) a topcoat layer deposed on the primer surfacer layer.

15. The coated article of claim 14 wherein the primer surfacer layer has a thickness of 2 to 4 mils.

16. The coated article of claim 14 in which the topcoat composition is an organic solvent-based composition.

17. The coated article of claim 16 in which the topcoat composition is an aminoplast curable composition.

* * * * *